United States Patent
Jackson et al.

(10) Patent No.: US 6,473,819 B1
(45) Date of Patent: Oct. 29, 2002

(54) SCALABLE INTERRUPTIBLE QUEUE LOCKS FOR SHARED-MEMORY MULTIPROCESSOR

(75) Inventors: Benedict Joseph Jackson; Paul Edward McKenney, both of Beaverton, OR (US); Ramakrishnan Rajamony; Ronald Lynn Rockhold, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,297

(22) Filed: Dec. 17, 1999

(51) Int. Cl.$^7$ ............................................... G06F 12/00
(52) U.S. Cl. ...................................................... 710/200
(58) Field of Search ............................... 710/200, 263, 710/264, 260, 52, 48; 709/213; 711/151

(56) References Cited

U.S. PATENT DOCUMENTS

| | | | |
|---|---|---|---|
| 5,175,837 A | | 12/1992 | Arnold et al. |
| 5,285,528 A | * | 2/1994 | Hart ........................... 710/200 |
| 5,317,739 A | * | 5/1994 | Elko et al. .................. 709/216 |
| 5,579,504 A | | 11/1996 | Callander et al. |
| 5,671,446 A | * | 9/1997 | Rakity et al. ................. 710/54 |
| 5,682,537 A | * | 10/1997 | Davies et al. ............... 710/200 |
| 5,860,159 A | | 1/1999 | Hagersten |

OTHER PUBLICATIONS

"Predictable Spin Lock Algorithms with Preemption", Hiroaki Takada and Ken Sakamura, Department of Information Science, Faculty of Science, University of Tokyo, 7–3–1, Hongo, Bunkyo–ku, Tokyo 113 Japan, 1994 IEEE, pp. 2–6.

"Scalable Spin Locks for Multiprogrammed Systems", Robert W. Wisniewski, et al., Department of Computer Science, Universtiy of Rochester, Rochester, NY 14627–0226, 1994 IEEE, pp. 583–589.

"QueuingSpin Lock Algorithms to Support Timing Predictability", Travis S. Craig, Department of Computer Science and Engineering, FR–35, University of Washington Seattle, WA 98195, 1993 IEEE, pp. 148–157.

"The Performance of Spin Lock Alternatives for Shared–Memory Multiprocessors", Thomas E. Anderson, IEEE Transactions on Parallel and Distributed Systems, vol. 1, No. 1, Jan. 1990, pp. 6–16.

* cited by examiner

Primary Examiner—Xuan M. Thai
(74) Attorney, Agent, or Firm—Casimer K. Salys; Bracewell & Patterson, L.L.P.

(57) ABSTRACT

A method for a computation agent to acquire a queue lock in a multiprocessor system that prevents deadlock between the computation agent and external interrupts. The method provides for the computation agent to join a queue to acquire a lock. Next, upon receiving ownership of the lock, the computation agent raises its priority level to a higher second priority level. In response to a receipt of an external interrupt having a higher priority level occurring before the computation agent has raised its priority level to the second higher priority level, the computation agent relinquishes ownership of the lock. Subsequent to raising its priority level to the second higher priority level, the computation agent determines if it still has ownership of the lock. If the computation agent determines that it has not acquired possession of the lock after raising its priority level, the computation agent rejoins the queue to reacquire the lock. In one embodiment of the present invention, the computation agent's priority level is restored to its original, i.e., first priority level, when it rejoins the queue to reacquire the lock.

26 Claims, 2 Drawing Sheets

SCALABLE INTERRUPTIBLE QUEUE LOCKS FOR SHARED-MEMORY MULTIPROCESSOR

BACKGROUND OF THE INVENTION

1. Technical Field of the Invention

The present invention relates generally to data processing and in particular to shared-memory multiprocessors. Still more particularly, the present invention relates to scalable interruptible queue locks for a shared-memory multiprocessor and a method of operation thereof.

2. Description of the Related Art

Operating system kernels require efficient locking primitives to enforce serialization. Spin locks and queue locks are two common serialization mechanisms. In addition to scalability and efficiency, interruptability is a desired trait. Because of atomicity requirements, a thread may have to raise its priority level before entering a critical section that manipulates memory. Additionally, enabling the thread to be interrupted while it is waiting for the lock increases the responsiveness of the system to interrupts.

A spin lock is a simple construct that uses the cache coherence mechanism in a multiprocessor system to control access to a critical section. A typical spin lock implementation has two phases. In the spin phase, the waiting computation agents, or threads, spin on a cached copy of a single global lock variable. It should be noted that in the context of operating system (OS) kernels, there is generally a one-to-one correspondence between computation agents, or threads, and processors. In the compete phase, the waiting computation agents all try to atomically modify the lock variable from the available to the held state. The one computation agent that succeeds in this phase has control of the lock; the others go back to the spin phase. The transition from the spin to the compete phase is initiated when the lock holder releases the lock by marking the lock variable as available.

Spin locks have two main advantages: they require only a few instructions to implement and they are easily designed to be interruptible. The main disadvantage of spin locks is that they do not scale well. The compete phase can cause significant contention on the system buses when a large number of computation agents simultaneously attempt to acquire the lock. Spin locks are thus suitable only for lightly contended locks. In addition, since the lock is not necessarily granted in first in first out (FIFO) order, spin locks are typically not fair.

In a queue lock, computation agents queue up to acquire the lock. The lock holder releases the lock by granting it to a computation agent at the head of the queue. If there are no computation agents in the queue, the lock is simply marked available to the next computation agent that tries to acquire it. Queue lock implementations typically involve two phases. In the enqueue phase, a computation agent joins the queue by atomically updating the queue data structure. In the spin phase, queued computation agents spin waiting for the lock to be granted. In contrast to spin locks, the computation agents in a queue lock spins at a distinct memory locations that typically map to distinct cache lines. A lock holder notifies that the lock is available by updating a single computation agents spin location. Since the computation agents spin on distinct memory locations, the lock holder wakes up only one computation agent when it releases the lock.

Queue locks are generally more complicated to implement than spin locks. Their main advantage is that they scale well. Unlike spin locks where a lock release causes a free-for-all among the waiting computation agents, at most one computation agent is woken up in a queue lock. This makes them particularly suited for heavily contended locks. Queue locks can enforce fairness by having the queue data structures preserve the order in which computation agents enqueue themselves. The main disadvantage of queue locks over spin locks is the increased number of memory operations caused by the enqueue-spin-wakeup cycle. For lightly contended locks, these extra operations can significantly increase the time it takes to acquire a lock.

An interruptible lock is one that can handle interrupts between the time when a computation agent expresses a desire to acquire a lock and the time that it actually acquires it. Depending on the contention for a lock and the time spent inside the critical section it controls, a significant period of time may elapse between when a computation agent begins the process of acquiring the lock and when it finally gets control. In order to preserve atomicity of accesses to key data structures, the system may enforce the restriction that the critical section be entered only at a high interrupt request level (IRQL). The priority level is typically an attribute of the operating environment wherein only interrupts above a certain priority will be serviced. On many systems, this is referred to as the IRQL. The ideal procedure for handling this situation is to have a computation agent wait for the lock at a lower IRQL and raise the IRQL only after the computation agent gets control of the lock.

TABLE 1

Spin lock

```
begin: while (lockvar == held);
       [temp = lockvar; lockvar = held]_ATOMIC
       if (temp == available)
           return
       else
           goto begin
```

Consider the spin lock algorithm shown above in Table 1. Table 2 below illustrates a mechanism for incorporating interruptability in this algorithm. The idea is to raise the IRQL just prior to entering the compete phase. If the attempt is successful, the lock would have been acquired at the higher IRQL. If the attempt fails, i.e., another computation agent has acquired the lock, the IRQL is restored to its original level. This ensures that any interrupt that would have been serviced at the original IRQL will continue to be serviced while the computation agent waits for the lock in the spin phase.

TABLE 2

Interruptible spin lock

```
       oldirql = GetIRQL( );
begin: while (lockvar == held);
       SetIRQL (HIGH);
       [temp = lockvar; lockvar = held]_ATOMIC
       if (temp == available)
           return
       else {
           SetIRQL (oldirql);
           goto begin;
       }
```

Making queue locks interruptible is not as simple as in the case of spin locks. The problem lies in the fact that in a queue lock, a computation agent can be granted the lock at any time after it joins the queue. Contrast this with a spin lock where a computation agent knows that it will not get control of the lock unless it initiates the compete phase. The straightforward approach of raising the IRQL after a queue lock has been acquired creates a window of vulnerability between when the lock is acquired and the IRQL is raised. During this transition period, a deadlock condition may occur. For instance, consider a low priority level external interrupt that occurs within this window. Furthermore, in the process of servicing this interrupt, let it be necessary to acquire the queue lock under consideration. The deadlock situation is now apparent. In order for the interrupt service handler to obtain the lock, the lock needs to be released. However, in order for the lock to be released, the interrupt service handler must finish, enabling the original lock acquire-release cycle to complete. Thus, a more sophisticated mechanism is required.

SUMMARY OF THE INVENTION

It is therefore an object of the present invention to provide an improved multiprocessor system.

It is another object of the present invention to provide scalable interruptible queue locks for shared-memory multiprocessors and a method of operation thereof.

To achieve the foregoing objects, and in accordance with the invention as embodied and broadly described herein, a method for a computation agent to acquire a queue lock in a multiprocessor system that prevents deadlock between the computation agent and external interrupts is disclosed. The method provides for the computation agent to join a queue to acquire a lock. Next, upon receiving ownership of the lock, the computation agent raises its priority level to a higher second priority level. In response to a receipt of an external interrupt having a higher priority level occurring before the computation agent has raised its priority level to the second higher priority level, the computation agent relinquishes ownership of the lock. Subsequent to raising its priority level to the second higher priority level, the computation agent determines if it still has ownership of the lock. If the computation agent determines that it has not acquired possession of the lock after raising its priority level, the computation agent rejoins the queue to reacquire the lock.

The present invention introduces a novel methodology of implementing queue locks that allows for interruptability from external interrupts while eliminating any deadlock conditions. The present invention accomplishes this by permitting the computation agent that has been given ownership of a lock to be able to relinquish ownership to another waiting computation agent when an intervening interrupt is encountered during the transition period when it is raising its priority level.

In one embodiment of the present invention, the computation agent's priority level is restored to its original, i.e., first priority level, when it rejoins the queue to reacquire the lock. In a related embodiment, the second priority level of the computation agent is higher than the priority level of the external interrupt.

In another embodiment of the present invention, the queue is implemented using a global bitmask wherein the number of bits in the global bitmask is equal to the number of computation agents in the multiprocessor system. It should be noted that, in other advantageous embodiments, the number of bits in the global bitmask is greater than the number of processors in the multiprocessor system allowing for scalability in the system.

In yet another embodiment of the present invention, the computation agent relinquishes ownership of the lock by releasing the lock to a second computation agent. In a related embodiment, the second computation agent is the next computation agent whose bit position in the global bitmask (that tracks requests for the lock) is to the left of the bit position on the left of the first computation agent, which has ownership of the lock, in the global bitmask that wants ownership of the lock. It should be readily apparent to those skilled in the art that, in other advantageous embodiments, the ownership of the lock may be passed to the next computation agent on the right of the first computation agent that indicates a desire to acquire the lock. The present invention does not intend to limit its practice to any one particular direction but requires that which ever direction (right or left) is selected be maintained to prevent starvation by eventually granting the lock to every waiting computation agent. Furthermore, in non-uniform memory (NUMA) system, the lock holder may give precedence to computation agents that reside on the same node as itself, taking care to avoid starvation by not doing this too many times in a row.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
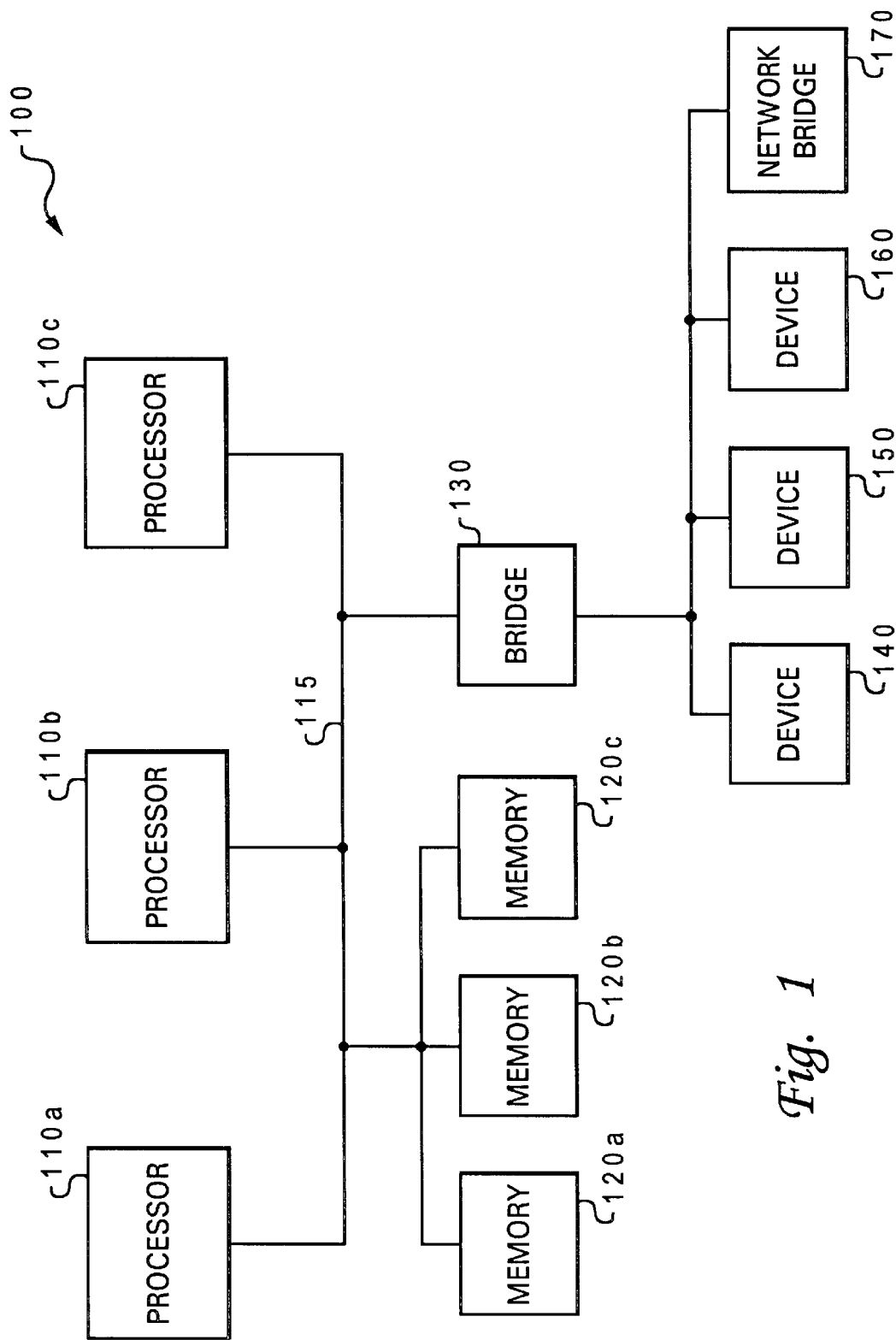
FIG. 1 illustrates an embodiment of a multiprocessor system that provides a suitable environment for the practice of the present invention.

With reference now to the figures, and in particular, with reference to FIG. 1, there is depicted an embodiment of a multiprocessor system 100 that provides a suitable environment for the practice of the present invention. Multiprocessor system 100 includes first, second and third processors 110*a*, 110*b*, 110*c* that are coupled to a plurality of memory, generally designated 120*a*, 120*b*, 120*c* via a system bus 115. Also shown coupled to system bus 115 is a bridge 130, such as a PCI bridge, that couples the plurality of processors 110*a*–110*c* and memory 120*a*–120*c* to first, second, third and fourth devices 140, 150, 160, 170. In the illustrated embodiment, the fourth device 170 is a network bridge that connects the multiprocessor system 100 to other systems in a local area network (LAN) or, alternatively, in a wide area network (WAN) configuration. First, second and third devices 140, 150, 160, in an advantageous embodiment, are sensors, actuators and network controllers that are part of a real-time system that provide external interrupts to first, second and third processors 110a, 110b, 110c. In an advantageous embodiment, each processor is dedicated to service the interrupts generated by a specific or a group of specific devices.

As discussed previously, a problem arises in deciding whether the interrupt priority level should be raised first or the lock be acquired first. When the interrupt priority level is raised only after the lock acquire succeeds, lower priority interrupts may be serviced after a computation agent, i.e., processor, has acquired the lock. Therefore, the condition that lower priority interrupts should be inhibited while a computation agents holds a lock cannot be satisfied. Conversely, if the lock acquire is attempted after raising the interrupt priority level, lower priority interrupts will not be serviced while the computation agent is waiting for the lock. Since a significant amount of time may elapse before a waiting computation agent acquires the lock, the responsiveness of the system to lower priority interrupts decreases.

Figure 2:
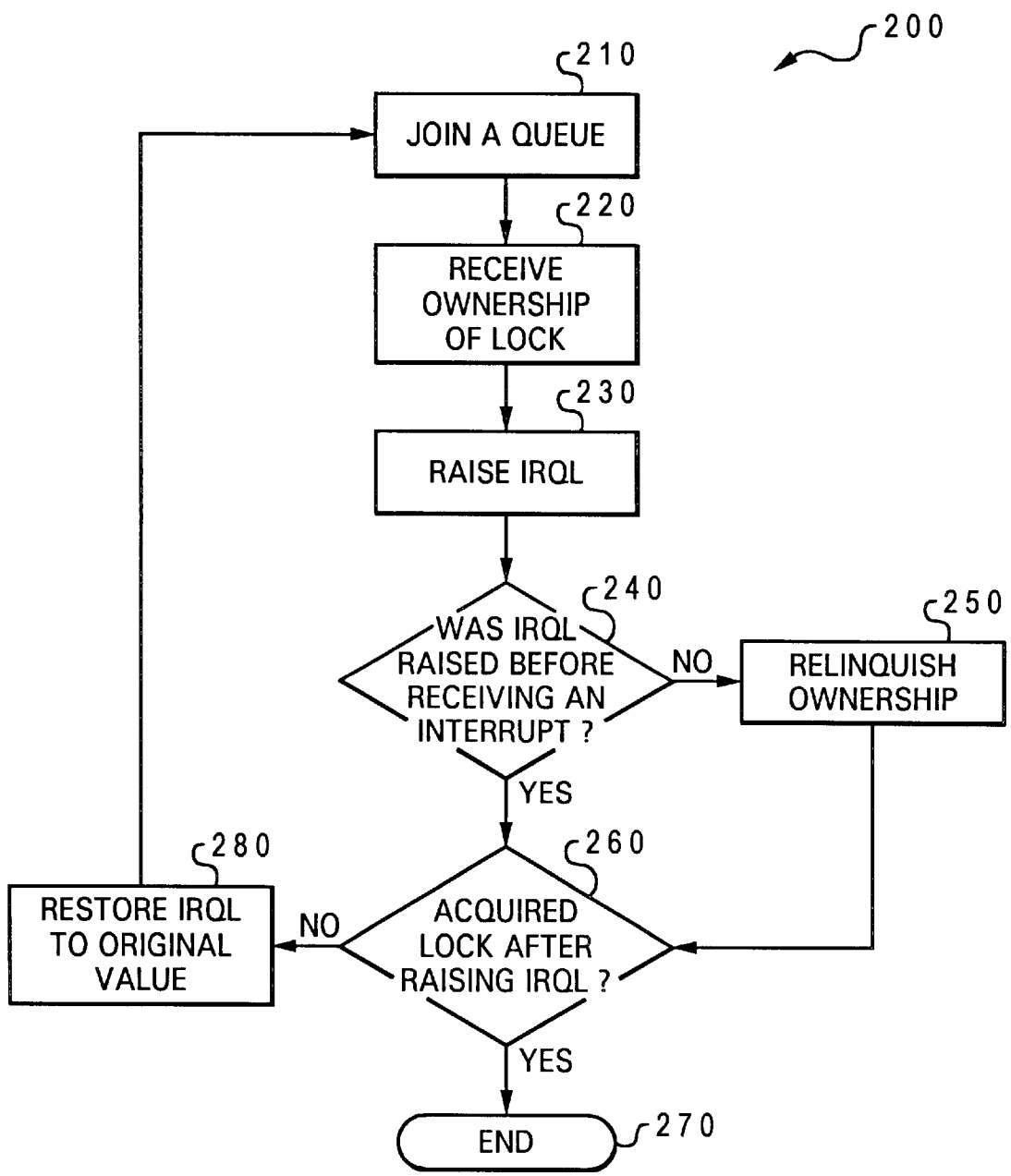
FIG. 2 illustrates a high-level flow diagram of an embodiment of an interruptible queue lock acquiring process using the principles disclosed by the present invention.

Referring now to FIG. 2, there is illustrated a high-level flow diagram of an embodiment of an interruptible queue lock acquiring process 200 using the principles disclosed by the present invention. Process 200 is initiated when a computation agent joins a queue, as depicted in step 210. The queue, in an advantageous embodiment, is a single global bitmask that keeps track of the computation agent that is currently holding, i.e., having possession, of the lock and the computation agents that are waiting for the lock. It should be noted that the number of bits in the global bitmask should be at least equivalent to the number of computation agents employed in a system. For example, for the system 100 depicted in FIG. 1, since there are three processors, there should be at least three bits in the global bitmask. It should be readily apparent to those skilled in the art that, in other advantageous embodiments, the number of bits in the global bitmask is greater than the number of processors in the multiprocessor system allowing for scalability in the system.

Each computation agent has a distinct spin location, also called a "slot," where it spins while waiting for the lock to be granted to it. In an advantageous embodiment, the slot associated with each computation agent is located locally to its corresponding processor. Additionally, computation agents may also have some local, i.e., private, state that they use to communicate with their interrupt handlers. The acquire operation is first described. An exemplary pseudo-code entitled Acquire () detailing the acquire operation is listed below in Table 3.

TABLE 3

Lock Acquire

Initial Values: oldmask=INVALID, INT_HAPPENED=FALSE
    Acquire (newIRQL)
    {
        retry: disable_interrupts
                [oldmask = MASK; MASK != mypid]
                Slot = WANT
            INT_HAPPENED = FALSE
        enable_interrupts
        if (oldmask != 0)
            while (slot == WANT &&
                    INT_HAPPENED == FALSE) ;
        oldirql = SetIRQL (newIRQL)
        oldmask = INVALID TABLE 3-continued Lock Acquire if (INT_HAPPENED == TRUE) {
            setIRQL (oldirql)
            INT_HAPPENED = FALSE
            goto retry
        }
            INT_HAPPENED = TRUE
        slot = GOTIT
        return oldirql
    }

In order to acquire a lock, the computation agent first disables interrupts and atomically obtains the existing value of the global bitmask and sets its bit in the global bitmask. The computation agent also preserves the existing value of the global bitmask (referred to as the captured bitmask). This will, in turn, indicate to the computation agent's interrupt handler of the computation agent intention to acquire the lock. Subsequently, with interrupts still disabled, the computation agent initializes its slot to "WANT," i.e., informing anyone releasing the lock that the computation agent is prepared to take ownership. At this time, it is safe to accept interrupts and consequently, the computation agent enables them. Following the enablement of the interrupts, the computation agent checks to determine if it has been granted ownership of the lock or have been interrupted, spinning until one of these conditions is true.

After receiving ownership of the lock, as illustrated in step 220, the computation agent eliminates interference from interrupts by raising its priority level, i.e., IRQL, to a second priority level required by the lock as depicted in step 230. The second priority level is typically greater, or higher, than the priority levels of any external interrupts.

Next, during the transitional period when the computation agent is raising its priority level to a higher level, process 200 inquires if an intervening interrupt has been received, as illustrated in decisional step 240. If it is determined at decisional step 240 that the acquiring computation agent has raised its priority level to the second higher priority level, process 200 continues without further action to decisional step 260.

At this point in the process, the computation agent sets its captured global mask value to "INVALID", allowing interrupts to still occur, but directing the interrupt handler not to take any action. Since the computation agent's priority level is at the lock's IRQL, no action needs to be taken by the interrupt handler. At this point, it can safely determined if an intervening interrupt has occurred during the transition period when the computation agent first receives ownership of the lock and when it raises its priority level to the second higher priority level, as illustrated in decisional step 260. Since in this case, no intervening interrupt occurred during the transition period, the computation agent now has possession of the lock and it returns its original priority level to its caller, as illustrated in step 270.

On the other hand, if the determination at decisional step 240 is that an intervening interrupt was received, the computation agent, as depicted in step 250, relinquishes ownership of the lock. An exemplary pseudo-code entitled Release() for operations performed at a lock release is listed below in Table 4.

TABLE 4

Lock Release

```
Release ( )
{
1.      slot = DONTWANT
2.   retry:  [if ((oldmask = MASK) == mymask) MASK = 0]
3.          if (oldmask == mymask)
4.              return;
5.          candidate = Chosen thread from MASK
6.          cslot = candidate's slot address
7.          [if ((oldcslot = *cslot) == WANT) *cslot = GOTIT]
8.          if (oldcslot == WANT)
9.              MASK &= !mypid
                return
            }
10.         else goto retry
}
```

The computation agent releases the lock by first setting its slot to "DONTWANT." This has the effect of preventing any future computation agent that may end up using a cached and invalid value of the global bitmask from assigning it back to the releasing computation agent. Next, the computation agent atomically reads the global bitmask, clearing its associated bit to zero if it is set in the bitmask. It should be noted that if the global bitmask is zero, indicating that there are no computation agents waiting for the lock, the release operation is done.

On the other hand, if there are computation agents waiting to acquire the lock, the computation agent releasing the lock must select one of the waiting computation agents and grant it the lock. Since a bitmask does not preserve the order in which the computation agents have queued up for the lock, the current lock holder must actively choose one of the waiting computation agents and grant it the lock. The present invention, in a preferred embodiment, requires the lock holder to examine the bitmask and select the first computation agent located to its left in the bitmask. It should be noted that this selection scheme is not first in first out (FIFO) since it gives precedence to a computation agent closer to the lock holder (on its left). This scheme, however, prevents starvation by eventually granting the lock to every waiting computation agent. Furthermore, by giving precedence to a computation agent closer to the lock holder than a computation agent farther away, the present invention may reduce memory traffic in large non-uniform memory access (NUMA) systems. It should be readily apparent to those skilled in the art that, in other advantageous embodiments, the ownership of the lock may be passed to the next computation agent on the right of the first computation agent that indicates a desire to acquire the lock. The present invention does not intend to limit its practice to any one particular direction but requires that which ever direction (right or left) is selected be maintained to prevent starvation by eventually granting the lock to every waiting computation agent. Furthermore, in NUMA systems, the lock holder may give precedence to computation agents that reside on the same node as itself, taking care to avoid starvation by not doing this too many times in a row.

In those circumstances where there is a computation agent waiting to acquire the lock, the slot location on which the waiting computation agent is spinning is first computed. This can be easily accomplished since each computation agent has a distinct slot on which it spins. Next, the slot value is atomically captured and examined. If the slot value was "WANT," i.e., indicating that it wants the lock, the slot value is then changed to "GOTIT." Furthermore if the slot value is "WANT," the handoff is complete and the releasing computation agent is now free to turn off its bit in the bitmask and return. It should be noted that a value other than "WANT" indicates that the chosen computation agent has either been interrupted or that a "stale" version of the bitmask has been examined. If this occurs, the releasing computation agent selects another waiting computation agent by reexamining the bitmask. Following the relinquishing of the lock to a second computation agent, process 200 proceeds to decisional step 260. Since in this case, an intervening interrupt has occurred, the computation agent does not have ownership of the lock. Therefore it needs to re-register for the lock. In order to accomplish this, the computation agent proceeds to restore its priority level to its original value, as depicted in step 280, and rejoins the queue.

The interrupt handler actions are relatively straightforward. An exemplary pseudo-code for the actions to be taken prior to actually servicing the interrupt entitle InterruptAction ( ) is listed below in Table 5.

TABLE 5

Interrupt Handler Action

```
InterruptAction ( )
{
    1.  if (oldmask == INVALID)
    2.      return
    3.  [if (oldslot = slot) ==WANT; slot = DONTWANT]
    4.  INT_HAPPENED = TRUE
    5.  if (oldslot == GOTIT ||
    6.      (oldmask == 0 &&
    7.          oldslot == WANT) ) {
    8.      Release ( )
            return;
    9.  } else
    10.     MASK &= !mypid
}
```

Prior to executing the interrupt code that will service the received interrupt, the interrupt handler first checks to determine if the computation agent is queued waiting for the lock. If the computation agent is not in the queue, the interrupt handler proceeds to execute the interrupt code. On the other hand, if the computation agent is in the queue, the interrupt handler atomically obtains the computation agent's local slot value and, if the value is "WANT," changes it to "DONTWANT." This will indicate to any potential releaser of the lock that the computation agent is, at least temporarily, not interested in acquiring ownership of the lock. Furthermore, the interrupt handler must determine whether or not the interrupted computation agent has already been granted ownership of the lock or will assume ownership of the lock, i.e., there were no other waiting computation agents wanting the lock. If so, the lock must be released, e.g., by calling Release( ) described above, that will pass ownership of the lock to the next waiting computation agent, if any exists. The interrupt handler can assume that the interrupted computation agent has been granted the lock if the captured value of the slot is "GOTIT." The interrupt handler can determine if the interrupted computation agent will assume ownership of the lock by checking the captured value of the mask. In the event that the bitmask is "0," the computation agent can assume that it was the only requestor for the lock and that this is the first interrupt since that event. In those conditions where the computation agent has not been assigned the lock, the interrupt handler will remove the computation agent's bit from the bitmask field. The Release code detailed above in Table 4 depends on this being eventually accomplished because it will keep checking the bitmask until it finds a computation agent to which it can grant the lock to, or until there are no computation agents waiting for the lock.

The interrupt handler and lock release operations described above are defined to close a second window of vulnerability. For example, consider a computation agent that has queued for the lock and is servicing an interrupt. If a current lock holder grants it the lock, the responsibility for passing the lock to another computation agent falls upon the interrupt handler. If the interrupt handler succeeds in updating the computation agent's slot value to "DONTWANT," the current lock holder then selects a different computation agent to which it will grant the lock to. Consequently, a computation agent that takes an interrupt leaves the queue and only rejoins the queue after the interrupt has been serviced.

It should be noted that although the present invention uses state variables such as oldmask and INT_HAPPENED, the information conveyed by these variables to the interrupt handler could be conveyed through the slot variable. In addition, it should also be apparent to those skilled in the art that the scheme outlined above for acquiring a lock could be easily modified to a conditional lock acquire wherein the lock is acquired only if it is free. Such a conditional lock acquire scheme has many uses. Furthermore, it should be noted that although the present invention has been described in the context of a computer system, those skilled in the art will readily appreciate that the present invention is also capable of being distributed as a computer program product in a variety of forms; the present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links.

In a preferred embodiment, the present invention is implemented in a multiprocessor system programmed to execute the method described herein. Accordingly, in an advantageous embodiment, sets of instructions for executing the method disclosed herein are resident in RAM of one or more of processors configured generally as described hereinabove. Until required by the multiprocessor system, the set of instructions may be stored as computer program product in another computer memory, e.g., a disk drive. In another advantageous embodiment, the computer program product may also be stored at another computer and transmitted to a user's computer system by an internal or external communication network, e.g., LAN or WAN, respectively.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a computation agent to acquire a queue lock in a multiprocessor system that prevents deadlock between said computation agent and external interrupts, comprising the steps of:
    (a) joining a queue to acquire a lock;
    (b) receiving ownership of said lock;
    (c) raising a first priority level of said computation agent to a higher second priority level in response to receiving ownership of said lock;
    (d) relinquishing ownership of said lock in response to a receipt of an external interrupt having a higher priority level, wherein said external interrupt occurs prior to said computation agent raising its priority level to said second priority level;
    (e) determining if said computation agent has acquired possession of said lock after it has raised its priority level; and
    (f) repeating step (a) in response to said determination that said computation agent has not acquired possession of said lock.

2. The method as recited in claim 1 wherein said step of repeating step (a) includes the step of restoring said computation agent's priority level to said first priority level.

3. The method as recited in claim 1 wherein said second priority level of said computation agent is higher than said priority level of said external interrupt.

4. The method as recited in claim 1 wherein said queue is implemented using a global bitmask.

5. The method as recited in claim 4 wherein the number of bits in said global bitmask is equal to the number of computation agents in said multiprocessor system.

6. The method as recited in claim 1 wherein said step of joining a queue includes the step of spinning locally.

7. The method as recited in claim 4 wherein said step of relinquishing ownership includes the step of releasing said lock to a second computation agent.

8. The method as recited in claim 7 wherein said second computation agent is the next computation agent on the left of said computation agent in said global bitmask that is requesting ownership of said lock.

9. The method as recited in claim 4 wherein said step of relinquishing ownership includes the step of giving precedence to a computation agent located on the same node of a non-uniform memory access (NUMA) system as said computation agent.

10. A computer program product, comprising:
    a computer-readable medium having stored thereon computer executable instructions for implementing queue locks in a multiprocessor system that prevents deadlock between a computation agent and external interrupts when said computation agent is attempting to acquire a lock, said computer executable instructions when executed, perform the steps of:
    (a) joining a queue to acquire a lock;
    (b) receiving ownership of said lock;
    (c) raising a first priority level of said computation agent to a higher second priority level in response to receiving ownership of said lock;
    (d) relinquishing ownership of said lock in response to a receipt of an external interrupt having a higher priority level, wherein said external interrupt occurs prior to said computation agent raising its priority level to said second priority level;
    (e) determining if said computation agent has acquired possession of said lock after it has raised its priority level; and
    (f) repeating step (a) in response to said determination that said computation agent has not acquired possession of said lock.

11. The computer program product as recited in claim 10 wherein said step of repeating step (a) includes the step of restoring said computation agent's priority level to said first priority level.

12. The computer program product as recited in claim 10 wherein said second priority level of said computation agent is higher than said priority level of said external interrupt.

13. The computer program product as recited in claim 10 wherein said queue is implemented using a global bitmask.

14. The computer program product as recited in claim 13 wherein the number of bits in said global bitmask is equal to the number of computation agents in said multiprocessor system.

15. The computer program product as recited in claim 10 wherein said step of joining a queue includes the step of spinning locally.

16. The computer program product as recited in claim 13 wherein said step of relinquishing ownership includes the step of releasing said lock to a second computation agent.

17. The computer program product as recited in claim 16 wherein said second computation agent is the next computation agent on the left of said computation agent in said global bitmask that is requesting ownership of said lock.

18. The computer program product as recited in claim 13 wherein said step of relinquishing ownership includes the step of giving precedence to a computation agent located on the same node of a non-uniform memory access (NUMA) system as said computation agent.

19. A multiprocessor system, comprising:
   a plurality of processors;
   a shared memory;
   a system bus for interconnecting said shared memory and said plurality of processors; and
   means for a computation agent to acquire a queue lock that prevents deadlock between said computation agent and external interrupts, including:
      means for joining a queue to acquire a lock;
      means for receiving ownership of said lock;
      means for raising a first priority level of said computation agent to a higher second priority level in response to receiving ownership of said lock;
      means for relinquishing ownership of said lock in response to a receipt of an external interrupt having a higher priority level, wherein said external interrupt occurs prior to said computation agent raising its priority level to said second priority level; and
      means for determining if said computation agent has acquired possession of said lock after it has raised its priority level.

20. The multiprocessor system as recited in claim 19 wherein said means for determining includes means for rejoining said queue in response to said computation agent not acquiring possession of said lock.

21. The multiprocessor system as recited in claim 19 wherein said shared memory comprises a plurality of memory.

22. The multiprocessor system as recited in claim 20 wherein said means for rejoining said queue includes means for restoring said computation agent's priority level to said first priority level.

23. The multiprocessor system as recited in claim 19 wherein said second priority level of said computation agent is higher than said priority level of said external interrupt.

24. The multiprocessor system as recited in claim 19 wherein said means for joining a queue includes means for spinning said computation agent locally.

25. The multiprocessor system as recited in claim 19 wherein said means for relinquishing ownership includes means for releasing said lock to a second computation agent.

26. The multiprocessor system as recited in claim 19 wherein said means for relinquishing ownership includes means for giving precedence to a computation agent located on the same node of a non-uniform memory access (NUMA) system as said computation agent.

* * * * *